United States Patent
Tong et al.

(10) Patent No.: US 8,184,855 B2
(45) Date of Patent: May 22, 2012

(54) THREE-LEVEL SCHEME FOR EFFICIENT BALL TRACKING

(75) Inventors: Xiaofeng Tong, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1079 days.

(21) Appl. No.: 11/953,818

(22) Filed: Dec. 10, 2007

(65) Prior Publication Data

US 2009/0147992 A1 Jun. 11, 2009

(51) Int. Cl.
*G06K 9/00* (2006.01)
(52) U.S. Cl. .................................. 382/103; 348/169
(58) Field of Classification Search .................. 382/100, 382/103, 106, 107; 348/135, 143, 169, 170, 348/171, 172, 208.14
See application file for complete search history.

(56) References Cited

U.S. PATENT DOCUMENTS

| | | | | |
|---|---|---|---|---|
| 5,764,283 A | * | 6/1998 | Pingali et al. | 348/169 |
| 5,969,755 A | * | 10/1999 | Courtney | 348/143 |
| 6,445,409 B1 | * | 9/2002 | Ito et al. | 348/155 |
| 6,643,387 B1 | * | 11/2003 | Sethuraman et al. | 382/107 |
| 7,085,401 B2 | * | 8/2006 | Averbuch et al. | 382/103 |
| 7,684,590 B2 | * | 3/2010 | Kampchen et al. | 382/103 |
| 7,817,822 B2 | * | 10/2010 | Sun et al. | 382/103 |

OTHER PUBLICATIONS

X. Yu, C. Xu, Q. Tian, and H. Leong, "A ball tracking framework for broadcast soccer video", In Proc. of IEEE International Conference on Multimedia & Expo (ICME), 2003.
D. Liang, Y. Liu, Q. Huang, and W. Gao "A scheme for ball detection and tracking in broadcast soccer video", IN Proc. of IEEE Pacific-Rim Conference on Multimedia (PCM, 2005.
F. Yan, A. Kostin, W. Christmas, J. Kittler, "A novel data association algorithm for object tracking in clutter with application to tennis video analysis", Proceedings of the 2006 IEEE Computer Society Conference on Computer Vision and Pattern Recognition, 2006.
J. Li, T. Wang, W. Hu, M. Sun, Y. Zhang, "Soccer highlights detection using two-dependence Bayesian network", In Proc. of IEEE International Conference on Multimedia & Expo (ICME), 2006.

* cited by examiner

*Primary Examiner* — Anand Bhatnagar
(74) *Attorney, Agent, or Firm* — Carrie A. Boone, P.C.

(57) ABSTRACT

A three-level ball detection and tracking method is disclosed. The ball detection and tracking method employs three levels to generate multiple ball candidates rather than a single one. The ball detection and tracking method constructs multiple trajectories using candidate linking, then uses optimization criteria to determine the best ball trajectory.

14 Claims, 9 Drawing Sheets

THREE-LEVEL SCHEME FOR EFFICIENT BALL TRACKING

TECHNICAL FIELD

This application relates to ball detection and tracking.

BACKGROUND

Ball detection and tracking may be significant for semantics, team activity, and tactics analysis in broadcast soccer video. Most previous work used traditional object tracking algorithms, such as Kalman filters, template matching, particle filters, and so on, to handle this problem. However, there may be some difficulties with these approaches: (1) the ball is small and does not have stable or discriminative characteristics; (2) there is much noise, for example, region blobs, player parts, line-marks, etc; (3) occlusion; and (4) camera motion and shot transition.

Thus, there is a continuing need for a ball detection and tracking mechanism that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a three-level ball detection and tracking method is disclosed. The ball detection and tracking method employs three levels to generate multiple ball candidates rather than a single one. The ball detection and tracking method constructs multiple trajectories using candidate linking, then uses optimization criteria to determine the best ball trajectory.

Figure 1:
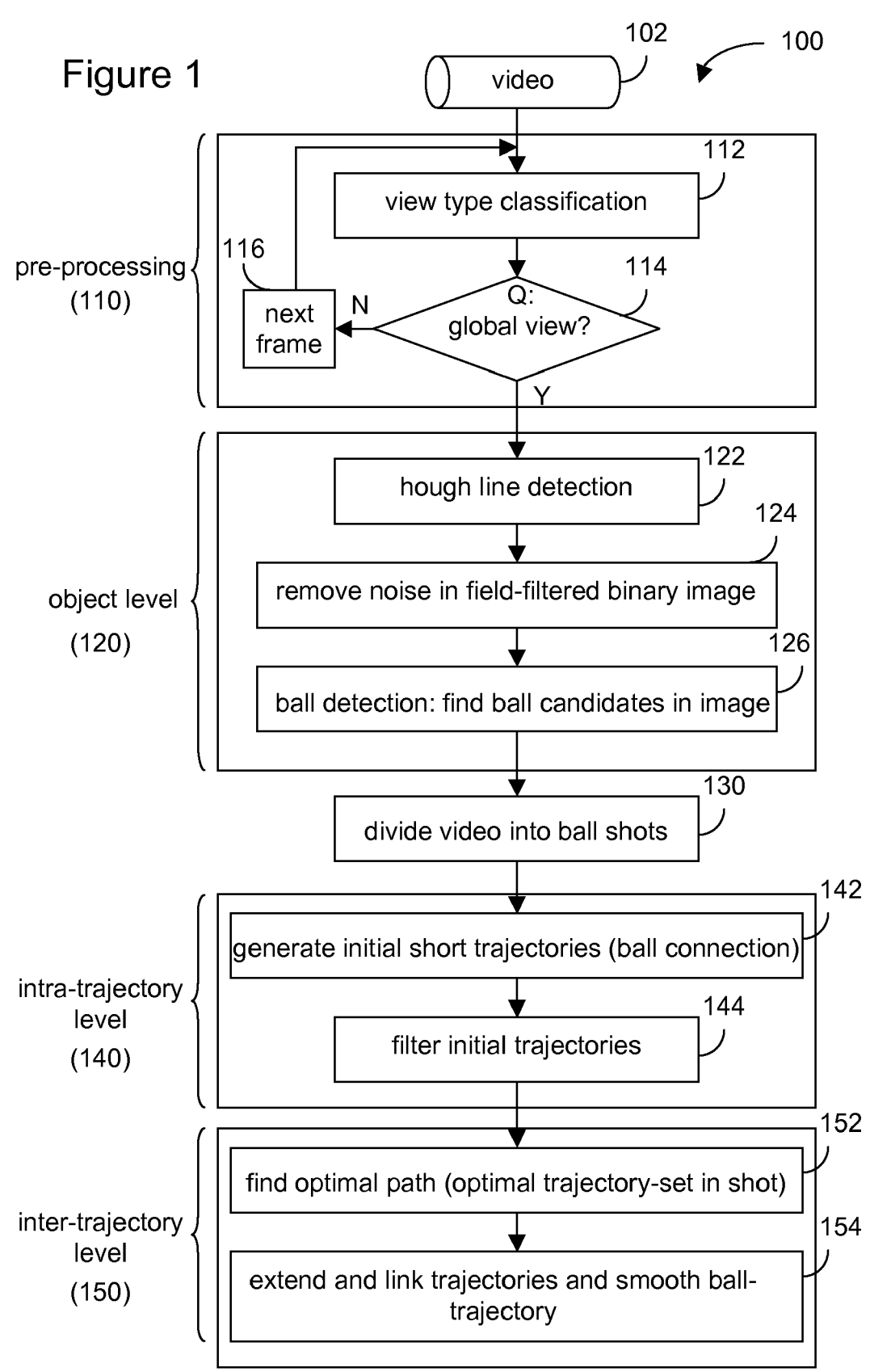
FIG. 1 is a block diagram of a three-level ball detection and tracking method, according to some embodiments.

FIG. 1 is a block diagram of one embodiment of a ball detection and tracking method 100. In particular, the ball detection and tracking method 100 is a trajectory-based object detection and tracking mechanism that selects multiple ball candidates instead of a single one.

The ball detection and tracking method 100 tracks the selected candidates, generates their trajectories, and experimentally measures their confidence. The ball detection and tracking method 100 thus finds the optimal path with the global optimization over trajectory level.

As illustrated in FIG. 1, the ball detection and tracking method 100 includes pre-processing 110, object-level processing 120, intra-trajectory processing 140, and inter-trajectory processing 150. The video 102, a multiple-frame video image, initially enters the pre-processing module 110. In some embodiments, each frame of the video 102 is sequentially processed. The pre-processing 110 may include dominant color learning, play-field segmentation, and view-type classification 112. The pre-processing module 110 may discern the dominant color by accumulating hue-saturation-value (HSV) color histograms. For example, in a video of a soccer game, the dominant color is likely to be green, the color of the playing field. Once the dominant color is known, the playing field is segmented with the dominant color. According to the area of the playing field and the size of non-field objects, the pre-processing module 110 may classify each view into one of four pre-defined types of views with a decision tree: global view, medium view, close-up, and out of view. Only global views are further processed, in some embodiments. Thus, in FIG. 1, if the view-type classification 112 does not produce a global view (block 114), the pre-processing module 110 proceeds to the next frame of the video 102 (block 116).

In some embodiments, the pre-processing module 110 has adaptation or learning capability in terms of videos with different environments, for example, strip fields, lighting changes, shadows, etc. The pre-processing module 110 thus guarantees the accuracy of playing field segmentation, and facilitates later processing by the other modules of the ball detection and tracking method 100.

The object level module 120 may receive global view frames from the pre-processing module 110. In a global view, the object level module 120 extracts the non-field regions by using dominant color segmentation. There may be, however, much noise in the frame to baffle ball detection. For example, line marks, player regions, false segmented regions (field blobs, body parts of players), etc., may be confused for the ball.

In some embodiments, to discriminate the ball and remove noise, the object level module 120 performs three steps of filtering. FIGS. 2A-2D are diagrams depicting the results of object level processing 120. In particular, the object level module 120 may use a transform, such as a Hough transform to detect direct lines within the playing field (the field line marks) and remove them (block 122 and FIG. 2B). Noises generated by line marks may have a negative effect for ball candidate selection because they are also white in color and have a regular motion (the camera motion, actually).

Additionally, embodiments of the object level module 120 filters out the unqualified regions for ball candidate selection. In some embodiments, regions with the following shape features are considered during the filtering process: a) size, the size of the longer axis of a region; b) area (A), area of the region; c) eccentricity, defined to be the ratio of the longer axis to the shorter axis; and d) circularity factor, represented as $4*\pi*A/P^2$, where P is the perimeter of the region contour. Through this step, most player regions with large size or area are removed (FIG. 2C).

Figure 2A:
FIGS. 2A-2D illustrate the process of object level processing by the ball detection and tracking method of FIG. 1, according to some embodiments.
Figure 2B:
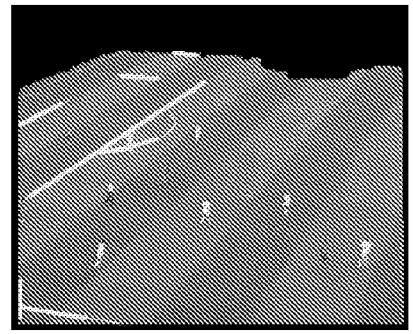
Figure 2C:
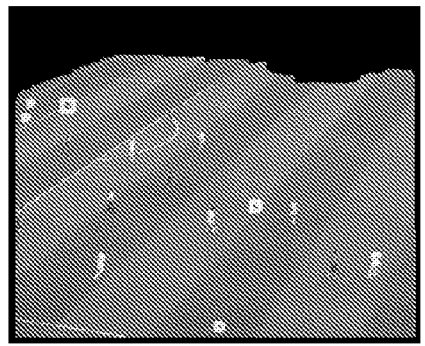
Figure 2D:
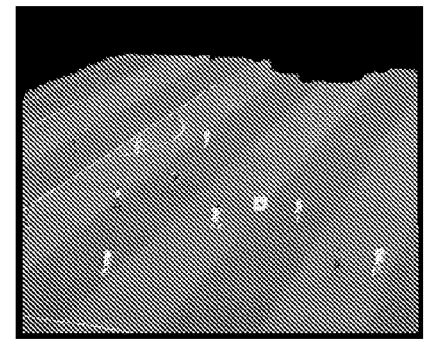

Further, in some embodiments, the object level module 120 utilizes a support vector machine (SVM) classifier with color information to further verify the ball candidates (FIG. 2D). A four-dimension color feature vector may be used: $<r, b, s, v>$, in which r=R/G, b=B/R in RGB color space, s and v are saturation and value components in HSV space. In the object level module 120, some fragment regions (usually parts of players, or false segmented filed regions) with small size and circle-like shape, but non-white color may be filtered out. These three filtering operations remove noise in the binary image (FIG. 1, block 124)

The results of the object level processing 120 are illustrated in FIGS. 2A-2D, according to some embodiments. In FIG. 2C, the region enclosed by red rectangles is selected by shape features. In FIG. 2D, the other four false candidates are removed by color cue.

In some cases, it may be difficult to determine the sole ball in real game videos, due to the difficulties mentioned above. The ball detection and tracking method 100 addresses this issue by selecting several ball candidates instead of the only one ball candidate in each frame. The several ball candidates are selected in the object level module 120 described above. Some embodiments of the ball detection and tracking method 100 also apply both color and shape features to filter out non-ball regions, thus reserving the true ball and removing many false alarms.

Referring to FIG. 1, following the object level processing 120, the ball detection and tracking method 100 may divide the video frame into ball shots or ball candidates (block 130). Once ball candidates are obtained for each frame, the intra-trajectory level module 140 of the ball detection and tracking method 100 is executed. The intra-trajectory level module 140 generates initial trajectories through linking the adjacent candidates in the spatial-temporal domain (block 142). The predication may be performed using a motion estimation algorithm by the intra-trajectory level module 140. In some embodiments, the motion estimation algorithm employs Kalman filtering, with the formation:

$$X_k = AX_{k-1} + w_k$$

$$Z_k = HX_k + v_k$$

where $X_k$ and $Z_k$ are the state and measurement vectors at time k, and $w_k$ and $v_k$ are system and measurement noises, respectively. A and H are state transition and measurement matrixes, respectively. The intra-trajectory level module 140 sets:

$$X = \begin{bmatrix} x \\ y \\ v_x \\ v_y \end{bmatrix}, Z = \begin{bmatrix} x \\ y \end{bmatrix}, A = \begin{bmatrix} 1 & 0 & 1 & 0 \\ 0 & 1 & 0 & 1 \\ 0 & 0 & 1 & 0 \\ 0 & 0 & 0 & 1 \end{bmatrix}, H = \begin{bmatrix} 1 & 0 & 0 & 0 \\ 0 & 1 & 0 & 0 \end{bmatrix}$$

where (x, y) is the ball's center coordinates, $(v_x, v_y)$ is the velocity in the x and y directions.

A trajectory may be initialized by a seed candidate that is not included by any trajectory, and grows if the position predicted by the Kalman filter is verified by a candidate in the next adjacent frame. The initial trajectories may link all possible candidates along a reasonable path. Most trajectories may not be correct, due to noise (false alarms in ball candidates). The intra-trajectory level module 140 may assign a confidence value (true, false, pendent) for each trajectory according to its length (see formula below) and removes the unconfident ones.

$$\text{confidence} = \begin{cases} \text{false}, & \text{if length} < T_1 \\ \text{true}, & \text{if length} > T_2 \\ \text{pendent}, & \text{otherwise} \end{cases}$$

In some embodiments, if a trajectory is covered by another one (see Table 1), it is also deleted. For example, trajectory A covered by trajectory B may mean: A.start>B.start and A.end<B.end. The other trajectories are reserved and may be identified through the inter-trajectory level module 150 later.

TABLE 1

Trajectory distance definition

| case number | Description | illumination | distance |
|---|---|---|---|
| 1 | A.end < B.start | A ———  B ····· | dist(A.end, B.start) |
| 2 | A.end > B.start and A.end ≦ B.end | A ———  B ········  A ———  B ·········· | min(dist(a,b)), a, b ∈ A ∩ B, a < b |
| 3 | A.end > B.end | A ———  B ······  A ———  B ·····  A ———  B ····· | ∞ |

Figure 3A:
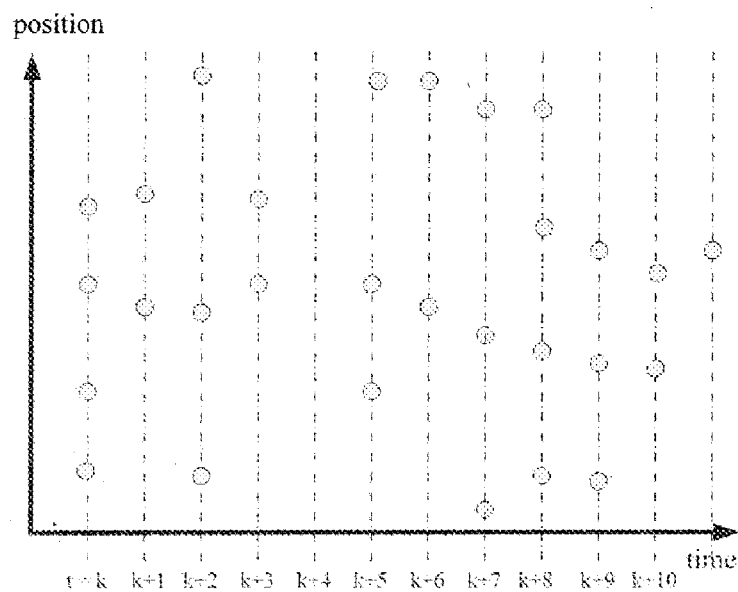
FIGS. 3A-3D illustrate the process of filtering by the ball detection and tracking method of FIG. 1, according to some embodiments.
Figure 3B:
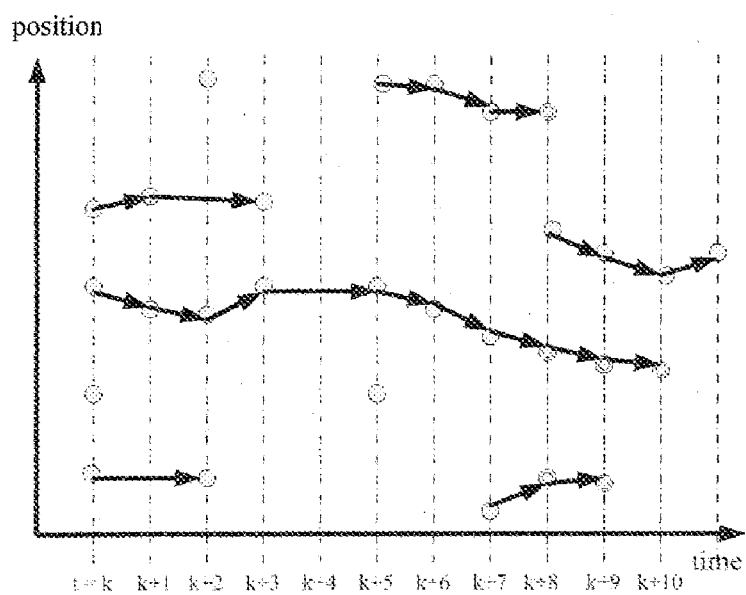
Figure 3C:
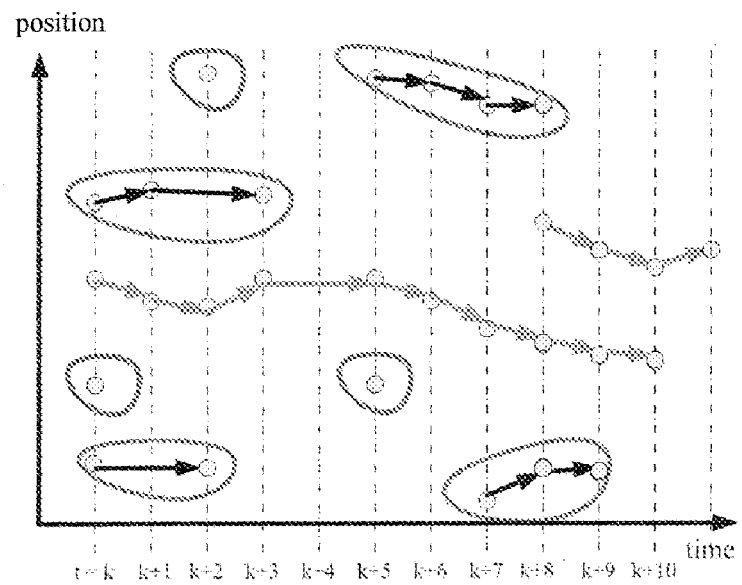
Figure 3D:
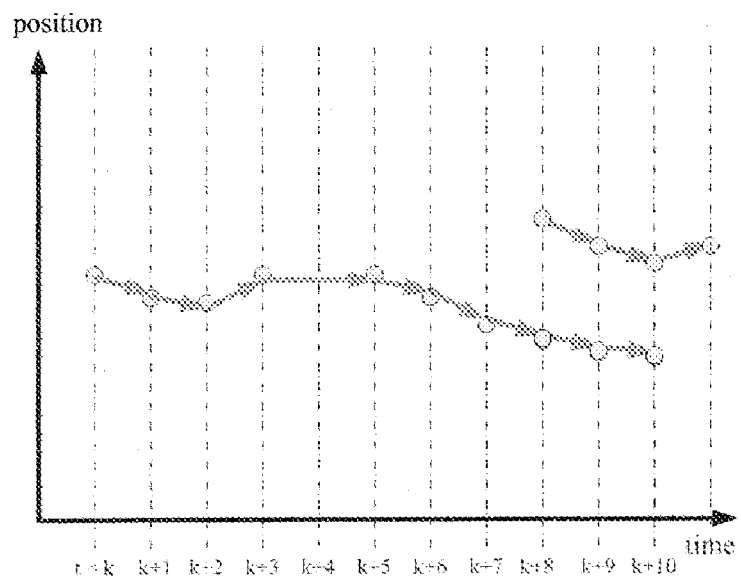

One embodiment of the filtering procedure is shown in FIGS. 3A-3D. Each graph plots time (horizontal axis) versus position (vertical axis). The ball candidates are shown in FIG. 3A. The initial trajectories are displayed in FIG. 3B. FIG. 3C shows one embodiment of a procedure of false trajectories filtering. The circled trajectories are false or uncertain. FIG. 3D is the filtering result.

The ball detection and tracking method 100 applies experimental rules to define the confidence for each trajectory and removes the trajectories with low confidence. The ball detection and tracking method 100 is demonstrated to be robust and effective on large testing videos.

Referring to FIG. 1, following the intra-trajectory level processing 140, the ball detection and tracking method 100 may employ inter-trajectory level processing 150. At the inter-trajectory level, the true trajectory of the ball may be found by using path optimization of the initial trajectories obtained at the intra-trajectory level 140. Generally, the ball's trajectory within a shot is smooth and continuous. The distance between two trajectories is defined and a distance graph for a shot is generated. Then, the inter-trajectory processing 150 determines the shortest path with an algorithm, such as a Dijkstra algorithm. The shortest path corresponds to optimal trajectories, in some embodiments.

In some embodiments, the inter-trajectory processing module 150 applies a time-line model to define the distance between two trajectories. Let A be a trajectory, A.start and A.end be its start and end time. The symbol "<" represents "earlier", ">" denotes "later", "≦" is "no later", "≧" is "no earlier". Also, "a" and "b" are ball candidates (including position and time information) in trajectory A and B, respectively. Based on the time order relationship defined on a time line, the inter-trajectory processing module 150 may define the distance between two trajectories below.

Assume $a=\langle x_a, y_a, t_a\rangle$, $b=\langle x_b, y_b, t_b\rangle$ be two ball points, then, $$\text{dist}(a,b)=\sqrt{(x_a-x_b)^2+(y_a-y_b)^2}+\alpha|t_a-t_b|$$

where $\alpha$ is a weighted factor for the time interval.

In the trajectory graph, a trajectory is taken as a node, and the linkage between trajectories are edges. The distance between two trajectories is set to be edge weight. In the trajectory graph, the inter-trajectory processing module 150 puts two additional nodes: start and end nodes. Once the distance graph is obtained, the inter-trajectory processing module 150 applies an algorithm, such as the Dijkstra algorithm, to find the optimal path from the start to the end node. The resultant optimal path includes the truth time-ordered trajectories.

Figure 4A:
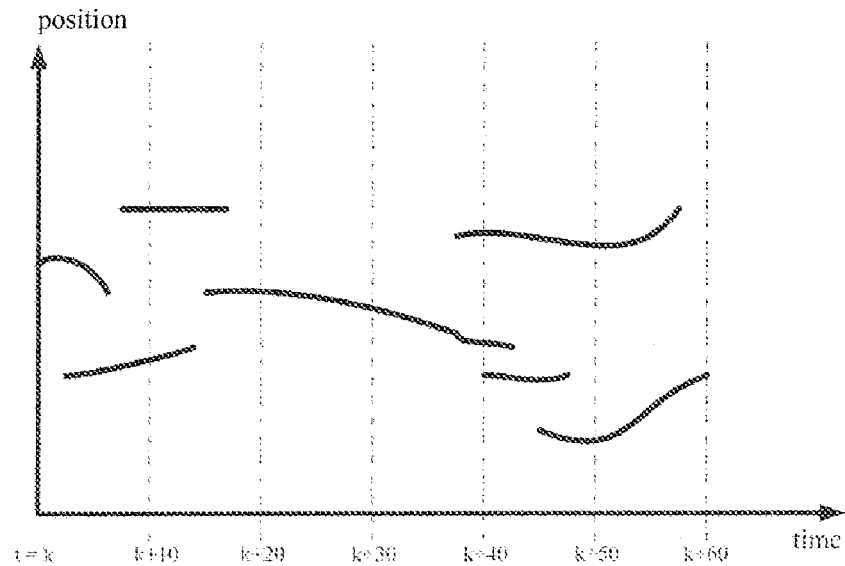
FIGS. 4A-4D illustrate the inter-trajectory processing of the ball detection and tracking method of FIG. 1, according to some embodiments.
Figure 4B:
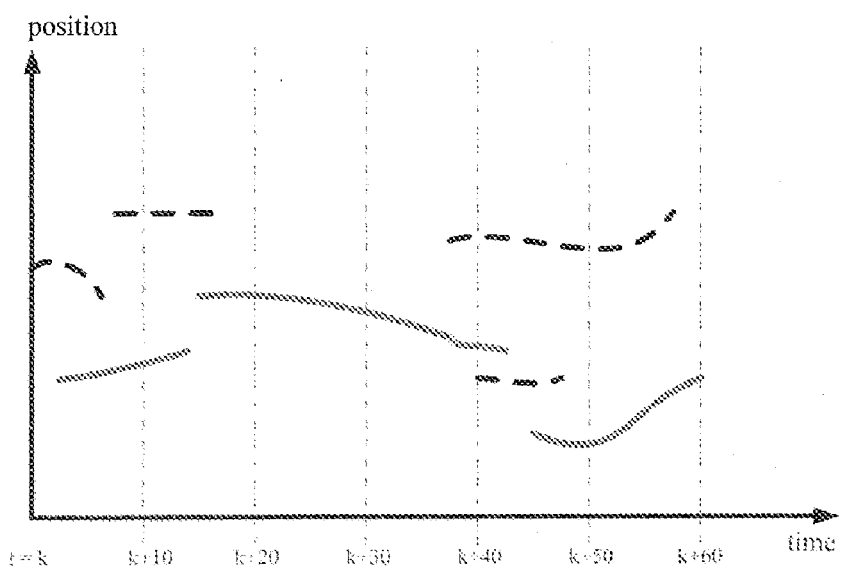
Figure 4C:
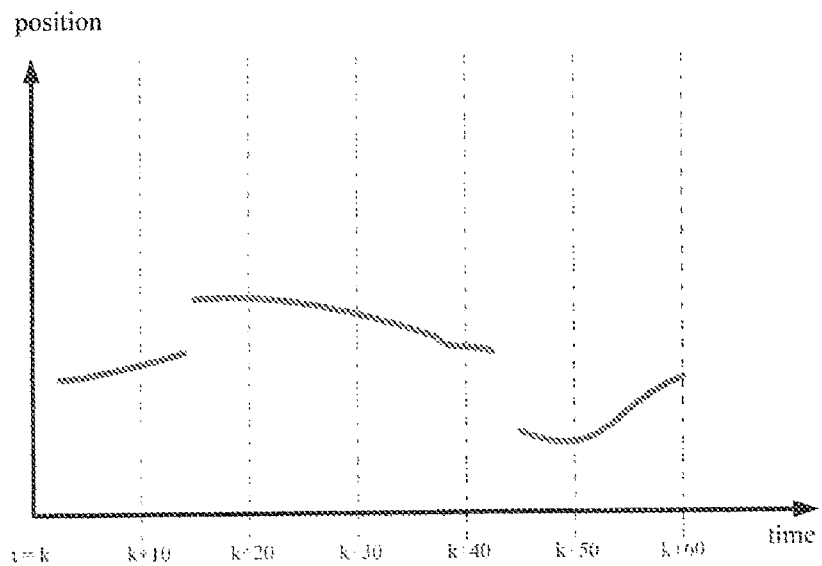

FIGS. 4A-4D portray an example of operations performed by the inter-trajectory processing module 150, according to some embodiments. The graphs show the ball trajectories for times t=k through t=k+60. Trajectories before optimization are shown in FIG. 4A. The inter-trajectory module 150 measures the distance between trajectories. Based on the measured distances, some trajectories are rejected while others are accepted. In FIG. 4B, the rejected trajectories are shown with dotted lines, while the accepted trajectories have solid lines. In FIG. 4C, the rejected trajectories are removed.

Figure 4D:
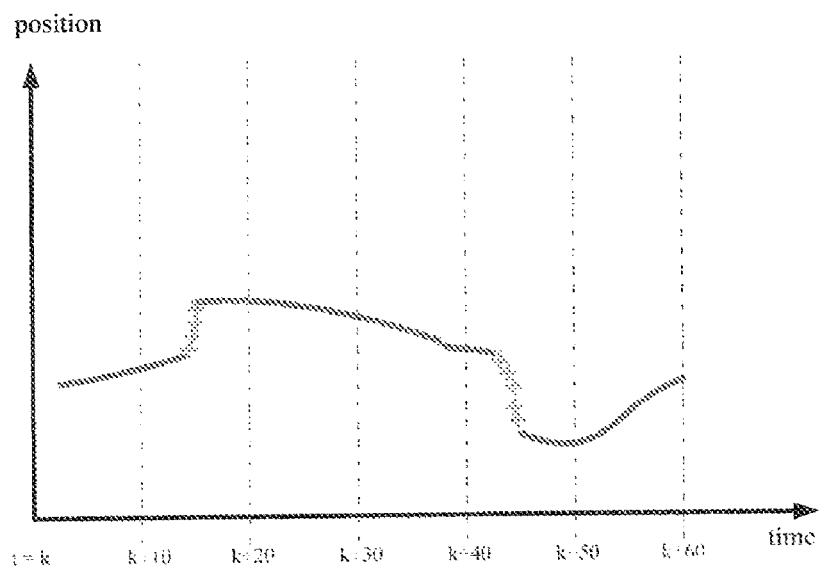

The interval between two adjacent trajectories in a shot is generated due to candidate missing during this time. The missing often occurs when there is a change of the motion speed and direction (motion model). With the optimal trajectory reasoning, the inter-trajectory processing module 150 is able to obtain the trajectories with constant motion models. The interval (gap) may be interpolated by the two trajectories sandwiching the gap. The inter-trajectory processing module 150 applies an interpolation method, such as cubic spline interpolation, to make up the interval. FIG. 4D is the interpolation result.

The distance between two trajectories may be obtained in the ball detection and tracking method 100, in contrast to prior art implementations. The optimal path may be determined through global optimization over trajectory level, which avoids some false but hard to be discriminated trajectories on object and intra-trajectory level.

In accordance with one embodiment of the ball detection and tracking method 100 is that cubic spline interpolation may be used to link the interval between two ends. This may allow the final trajectory to become smooth and continuous. Further, some interval due to occlusion may be made up. Experimental results are described below.

Figure 5A:
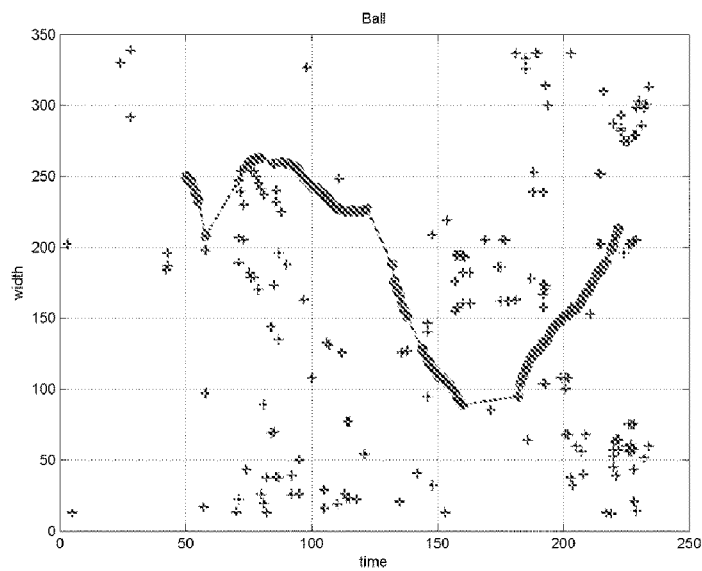
FIGS. 5A-5D are width-time maps showing performance of the ball detection and tracking method of FIG. 1, according to some embodiments.
Figure 5B:
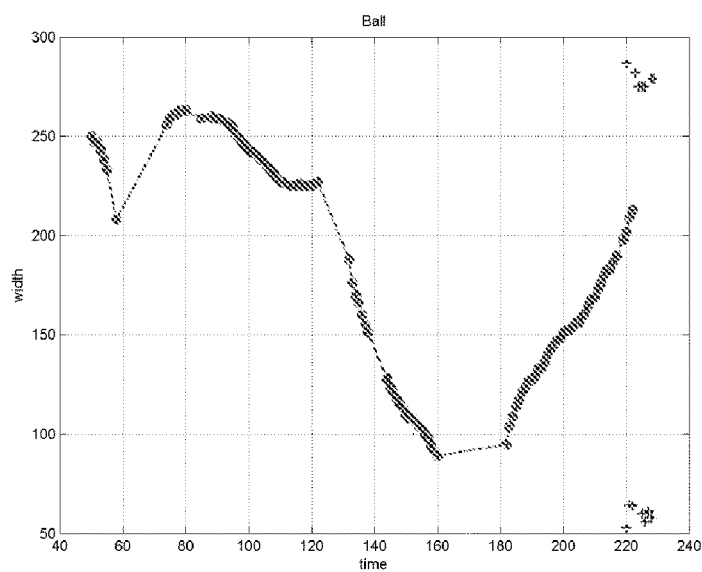
Figure 5C:
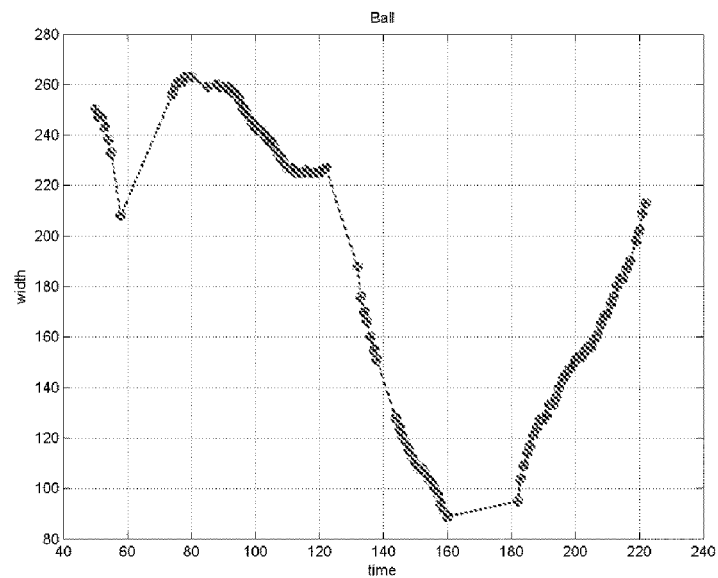
Figure 5D:
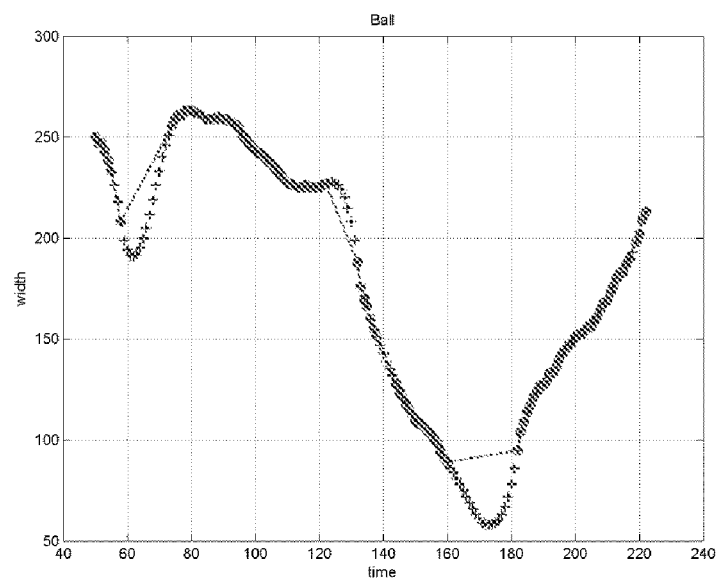

In experiments performed, every frame of a one-minute FIFA2006 video clip is labeled to evaluate the algorithm performance. In the one-minute video, the middle results of the first ball-shot are extracted and shown in FIGS. 5A-5D, according to some embodiments. The automatic detected/tracked results are displayed with a "+", while the true results are showed by an "o". The graphs of FIGS. 5A-5D plot time (horizontal axis) versus width of the image frame (vertical axis), also known as a width-time map. The ball candidates detected by shape and color cues are shown in FIG. 5A. Trajectories linked by these candidates and filtered results are displayed in FIG. 5B. FIG. 5C shows the optimal path obtained using the Dijkstra algorithm. FIG. 5D displays the linking and smoothing results.

Figure 6:
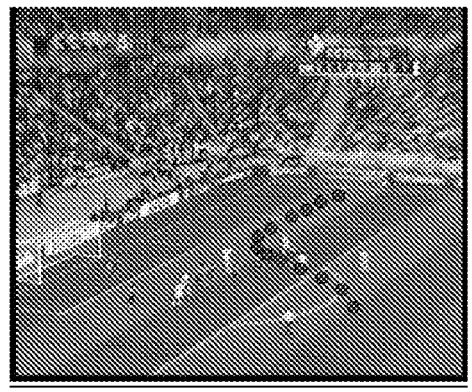
FIG. 6 is a diagram of smoothing and interpolation results using the ball detection and tracking method of FIG. 1, according to some embodiments.

The smoothing and interpolation results for the segment from frame 50 to 89 are shown in FIG. 6, according to some embodiments. The ground truth is displayed by dashed lines, and the tracking and interpolated result is displayed by filled circles. Actually, some ground truth is obtained by estimation and is impossible to be detected, due to occlusion and shape blur. But, in the experiments, these frames are labeled to compare with the interpolation results. FIG. 6 shows that the interpolated points are very close to the truth, although there are some distances.

Further, the experiments accurately compare the tracking results with the ground truth, frame by frame, on the one-minute video. The related information is given in Table 2, according to some embodiments.

TABLE 2

Information of the one-minute video clip

| total (frame) | global-view | ball-shot | Detected ball-frame | tracked ball-frame |
|---|---|---|---|---|
| 1497 | 928 | 3 | 356 | 572 |

There are three ball-shots in this clip. The shot information is correctly obtained through frame interval segmentation. In the detection phase, the ball is correctly located in 356 frames. Through tracking, the ball detection and tracking method 100 is able to finally obtain more ball-frames. The incremental frames are obtained by interpolation. It may be impossible to detect the ball in these frames due to occlusion or background clutter, in some embodiments. Most of the frames are correctly interpolated, but some of them are false, due to motion model change. The result is shown in Table 3.

TABLE 3

Tracking performance

| correct | false | missing | precision | recall | f-score |
|---|---|---|---|---|---|
| 494 | 78 | 165 | 86.36% | 74.96% | 80.26% |

The ball detection and tracking method 100 is also tested on a complete game between Spain and France in FIFA2006, with similar performance results. The processing, including all modules (view-type classification 112, line-marks detection with Hough transform 122, three-level ball tracking) is beyond real-time on an Intel Core 2 Dual machine (2.4 G×2 CPU, 2.0 G RAM). The testing data is an MPEG2 format (image size: 720×576 pixels, 25 fps). The operation speed is given in Table 4.

TABLE 4

Processing speed

| operation | time (seconds) | speed (fps) |
|---|---|---|
| only view-type | 24.48 | 61.15 (1497/24.48) |
| only ball tracking | 17.50 | 53.03 (928/17.50) |
| view-type + ball tracking | 41.98 | 35.66 (1497/41.98) |

The ball detection and tracking method 100 performs object detection and tracking through trajectory verification and optimization instead of determination in each frame. The idea of the ball detection and tracking method 100 can be generalized to other object detection and tracking applications, with lower discriminative features.

Some modules involved in the ball detection and tracking method 100 are common and widely utilized in computer vision and video analysis, such as Hough line detection and Kalman filtering. Optimization and parallelization of the modules of the ball detection and tracking method 100 (e.g., pre-processing module 110, object level module 120, intra-trajectory module 140, and inter-trajectory module 150) are of great benefit to media platforms, in some embodiments.

Figure 7:
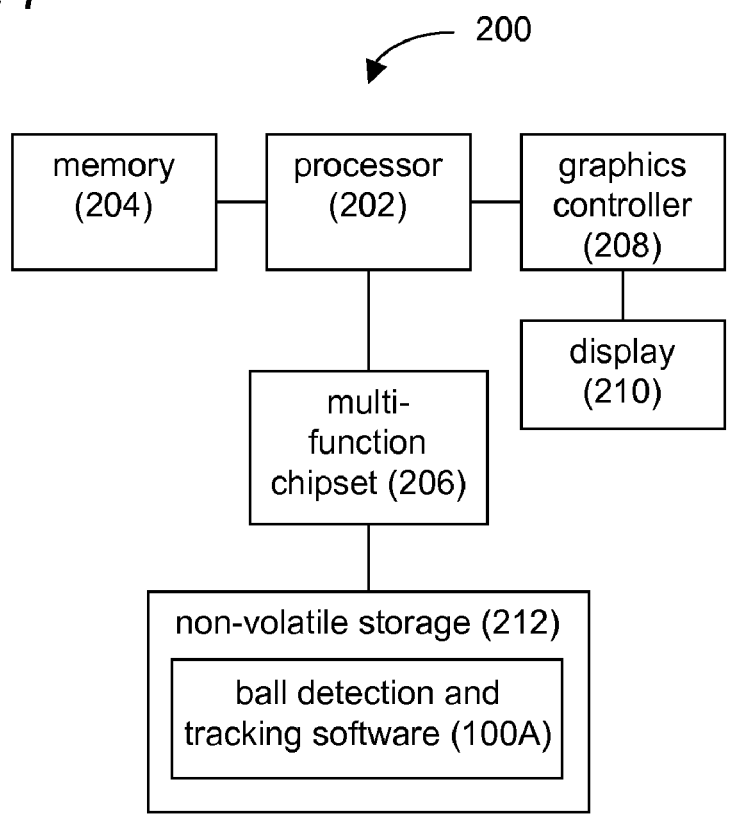
FIG. 7 is a block diagram of a processor-based system employing the ball detection and tracking method of FIG. 1, according to some embodiments.

The ball detection and tracking method 100 may be implemented using software. FIG. 7 is a block diagram of a processor-based system 200, including ball detection and tracking software 100A, according to some embodiments. The processor-based system 200 includes a processor 202, a memory 204, a graphics controller 208, and a display 210. The processor-based system 200 further includes a multiple-function chipset 206, which may support many functions not shown in FIG. 7, such as keyboard, mouse, serial ports, parallel ports, and storage media. A non-volatile storage 212 is connected to the multi-function chipset 206. The non-volatile storage 212 may be a fixed disk drive, a compact disc (CD) read-only memory (ROM) drive, a universal serial bus (USB) drive, and so on. The ball detection and tracking software 100A is stored in the non-volatile storage 212, and may be loaded into the memory 204 prior to execution.

While the application has been described with respect to a limited number of embodiments, those skilled in the art will appreciate numerous modifications and variations therefrom. It is intended that the appended claims cover all such modifications and variations as fall within the true spirit and scope of this disclosure.

We claim:

1. A ball detection and tracking method operable on a multiple-frame video image, the ball detection and tracking method being executable on a processor-based system, the ball detection and tracking method comprising:
   receiving a global view frame of a frame of the multiple-frame video;
   selecting multiple ball candidates from the global view frame;
   generating initial trajectories through linking adjacent ball candidates in a spatial-temporal domain;
   using path optimization to obtain a true trajectory from the initial trajectories obtained; and
   using a Hough transform to remove lines that generate noise, wherein the noise impairs ball candidate selection.

2. The ball detection and tracking method of claim 1, further comprising:
   receiving a frame of the multiple-frame video; and
   sending the frame to the object level processing only if the frame is a global view frame.

3. The ball detection and tracking method of claim 2, further comprising:
   discerning a dominant color in the frame by accumulating hue-saturation-value color histograms of the frame; and
   segmenting the frame according to the dominant color.

4. A ball detection and tracking method operable on a multiple-frame video image presentable to a display on a processor-based system, the ball detection and tracking method comprising:
   receiving a global view frame of a frame of the multiple-frame video;
   selecting multiple ball candidates from the global view frame;
   generating initial trajectories through linking adjacent ball candidates in a spatial-temporal domain;
   using path optimization to obtain a true trajectory from the initial trajectories obtained; and
   filtering one or more regions out of the global view frame, the filtered regions being unqualified for ball candidate selection based on size, area, eccentricity, and/or circularity factor.

5. The ball detection and tracking method of claim 4, obtaining multiple ball candidates from the global view frame further comprising:
   using a support vector machine classifier with color information to verify ball candidates.

6. The ball detection and tracking method of claim 4, generating initial trajectories through linking adjacent ball candidates in a spatial-temporal domain further comprising:
   using a motion estimation algorithm to generate the initial trajectories.

7. The ball detection and tracking method of claim 6, using a motion estimation algorithm to generate the initial trajectories further comprising:
   for each ball candidate, using Kalman filtering with the formation:

$X_k = AX_{k-1} + w_k$ $Z_k = HX_k + v_k$ where $X_k$ is a state vector at time k, $Z_k$ is a measurement vector at time k, $w_k$ is system noise, $v_k$ is measurement noise, A is a state transition matrix and H is a measurement matrix.

8. The ball detection and tracking method of claim 7, further comprising:
   for each ball candidate, setting $$X = \begin{bmatrix} x \\ y \\ v_x \\ v_y \end{bmatrix}, Z = \begin{bmatrix} x \\ y \end{bmatrix}, A = \begin{bmatrix} 1 & 0 & 1 & 0 \\ 0 & 1 & 0 & 1 \\ 0 & 0 & 1 & 0 \\ 0 & 0 & 0 & 1 \end{bmatrix}, H = \begin{bmatrix} 1 & 0 & 0 & 0 \\ 0 & 1 & 0 & 0 \end{bmatrix},$$

where (x, y) is a center coordinate of a ball candidate, ($v_x$, $v_y$) is a velocity in the x and y directions.

9. The ball detection and tracking method of claim 6, further comprising:
   assigning a confidence value for each trajectory according to its length, the confidence value being either true, false, or pendent; and
   removing those trajectories for which the confidence value is false.

10. The ball detection and tracking method of claim 4, using path optimization to obtain a true trajectory from the initial trajectories obtained further comprising:
    defining a distance between two trajectories of the initial trajectories obtained; and
    generating a distance graph based on the defined distance.

11. The ball detection and tracking method of claim 10, defining a distance between two trajectories of the initial trajectories obtained further comprising:
    applying a time-line model to define a distance between the two trajectories.

12. The ball detection and tracking method of claim 10, further comprising:
    using a Dijkstra algorithm to determine the shortest path between trajectories.

13. The ball detection and tracking method of claim 11, further comprising:
    using cubic spline interpolation to link an interval between ends of the two trajectories.

14. The ball detection and tracking method of claim 4, selecting multiple ball candidates from the global view frame further comprising selecting four ball candidates from the global view frame.

* * * * *